United States Patent
Vlaiko et al.

(10) Patent No.: US 12,379,877 B2
(45) Date of Patent: Aug. 5, 2025

(54) READ-PROTECTED STORAGE DEVICE WITH SEQUENTIAL LOGGING

(71) Applicant: Western Digital Technologies, Inc., San Jose, CA (US)

(72) Inventors: Julian Vlaiko, Kfar Saba (IL); Judah Gamliel Hahn, Ofra (IL); Aki Bleyer, Givatayim (IL); Shay Benisty, Beer Sheva (IL); Alexander Bazarsky, Holon (IL); Ariel Navon, Revava (IL)

(73) Assignee: Sandisk Technologies, Inc., Milpitas, CA (US)

( * ) Notice: Subject to any disclaimer, the term of this patent is extended or adjusted under 35 U.S.C. 154(b) by 14 days.

(21) Appl. No.: 18/490,364

(22) Filed: Oct. 19, 2023

(65) Prior Publication Data
US 2025/0130738 A1    Apr. 24, 2025

(51) Int. Cl.
*G06F 12/00* (2006.01)
*G06F 3/06* (2006.01)

(52) U.S. Cl.
CPC .......... *G06F 3/0659* (2013.01); *G06F 3/0622* (2013.01); *G06F 3/064* (2013.01); *G06F 3/0679* (2013.01)

(58) Field of Classification Search
CPC ...... G06F 3/0659; G06F 3/0622; G06F 3/064; G06F 3/0679

USPC .......................................................... 711/154
See application file for complete search history.

(56) References Cited

U.S. PATENT DOCUMENTS

| | | | |
|---|---|---|---|
| 9,489,507 B2 | 11/2016 | Torres | |
| 11,061,566 B2 | 7/2021 | Chung | |
| 11,294,581 B2 | 4/2022 | Harrison et al. | |
| 12,086,450 B1 * | 9/2024 | Lazier | G06F 3/0611 |
| 2017/0286325 A1 | 10/2017 | Singh et al. | |
| 2021/0373799 A1 * | 12/2021 | Yan | G06F 3/0604 |
| 2022/0197817 A1 | 6/2022 | Yoshida et al. | |
| 2023/0043303 A1 * | 2/2023 | Lee | G06F 9/4401 |

* cited by examiner

*Primary Examiner* — Mardochee Chery
(74) *Attorney, Agent, or Firm* — PATTERSON + SHERIDAN, LLP

(57) ABSTRACT

Instead of incorporating a single interface towards the host for transferring data, utilizing a designated write-only storage logging device. The write-only storage logging device can accept sequential streams and automatically overwrite. The controller will read the log material in a secure manner using a different and separate physical connection than the one used for write. The storage device may have LBA ranges that work as write-only as well as other LBA ranges, which are normal (both reads and writes are enabled). Both options will allow for a traditional file system as well as sharing the storage, but will still protect the log areas that would be used for events that should not be read out.

20 Claims, 5 Drawing Sheets

READ-PROTECTED STORAGE DEVICE WITH SEQUENTIAL LOGGING

BACKGROUND OF THE DISCLOSURE

Field of the Disclosure

Embodiments of the present disclosure generally relate to improving privacy protection level of SSDs.

Description of the Related Art

Privacy of storage devices is of an emerging importance both in retail markets as well as in enterprise applications, such as the automotive industry. The main goal of the data privacy security means is validating that no data can be read from the storage device unless permitted.

Storage devices, such as vehicle based loggers (black boxes) or surveillance cameras, write data continuously when the corresponding host is operating. However, the stored data is only read on special occasions when the device is subject to thorough examination, such as forensic evidence in case of a collision. Standard security countermeasures are based on hardware (HW) and firmware (FW) elements that function as a "selective-gate" that controls the data read from the storage device.

However, due to acceleration of fraud hacking capabilities, there is an importance to enhance privacy protection capabilities of such storage devices in a different approach to current security conventions. Given the myriad of camera, radar, LiDAR, sonic sensors that are built into a vehicle, there is significant importance, and most likely under future privacy legislation, to protect identity and whereabouts privacy for the vehicle, in-vehicle passengers, people outside the vehicle, other vehicles, and respective passengers.

Therefore, there is a need in the art for improving write-only storage logging in SSDs.

SUMMARY OF THE DISCLOSURE

Instead of incorporating a single interface towards the host for transferring data, utilizing a designated write-only storage logging device. The write-only storage logging device can accept sequential streams and automatically overwrite. The controller will read the log material in a secure manner using a different and separate physical connection than the one used for write. The storage device may have LBA ranges that work as write-only as well as other LBA ranges, which are normal (both reads and writes are enabled). Both options will allow for a traditional file system as well as sharing the storage, but will still protect the log areas that would be used for events that should not be read out.

In one embodiment, a data storage device comprises: a memory device; and a controller coupled to the memory device, wherein the controller is configured to: receive a first request to write data to the memory device, wherein the first request is transmitted through a first interface; write data to the memory device; and receive a second request to read data from the memory device, wherein the second request is through a second interface, and wherein the second interface is distinct from the first interface.

In another embodiment, a data storage device comprises: a memory device; and a controller coupled to the memory device, wherein the controller comprises: a first interface, wherein the first interface configured to receive commands to write data to the memory device; and a second interface, wherein the second interface is configured to receive commands to read data from the memory device, wherein the first interface and the second interface are physically distinct, wherein the controller is configured to ignore read commands received through the first interface.

In another embodiment, a data storage device comprises: means to store data; and a controller coupled to the means to store data, wherein the controller is configured to: receive a request to read data from the means to store data; determine that the data corresponding to the request is disposed in a restricted partition of the means to store data; authenticate an interface through which the request arrived, wherein the interface is a different interface than through which commands to write the data to the means to store data are received; and read the data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of incorporating a single interface towards the host for transferring data, utilizing a designated write-only storage logging device. The write-only storage logging device can accept sequential streams and automatically overwrite. The controller will read the log material in a secure manner using a different and separate physical connection than the one used for write. The storage device may have LBA ranges that work as write-only as well as other LBA ranges, which are normal (both reads and writes are enabled). Both options will allow for a traditional file system as well as sharing the storage, but will still protect the log areas that would be used for events that should not be read out.

Figure 1:
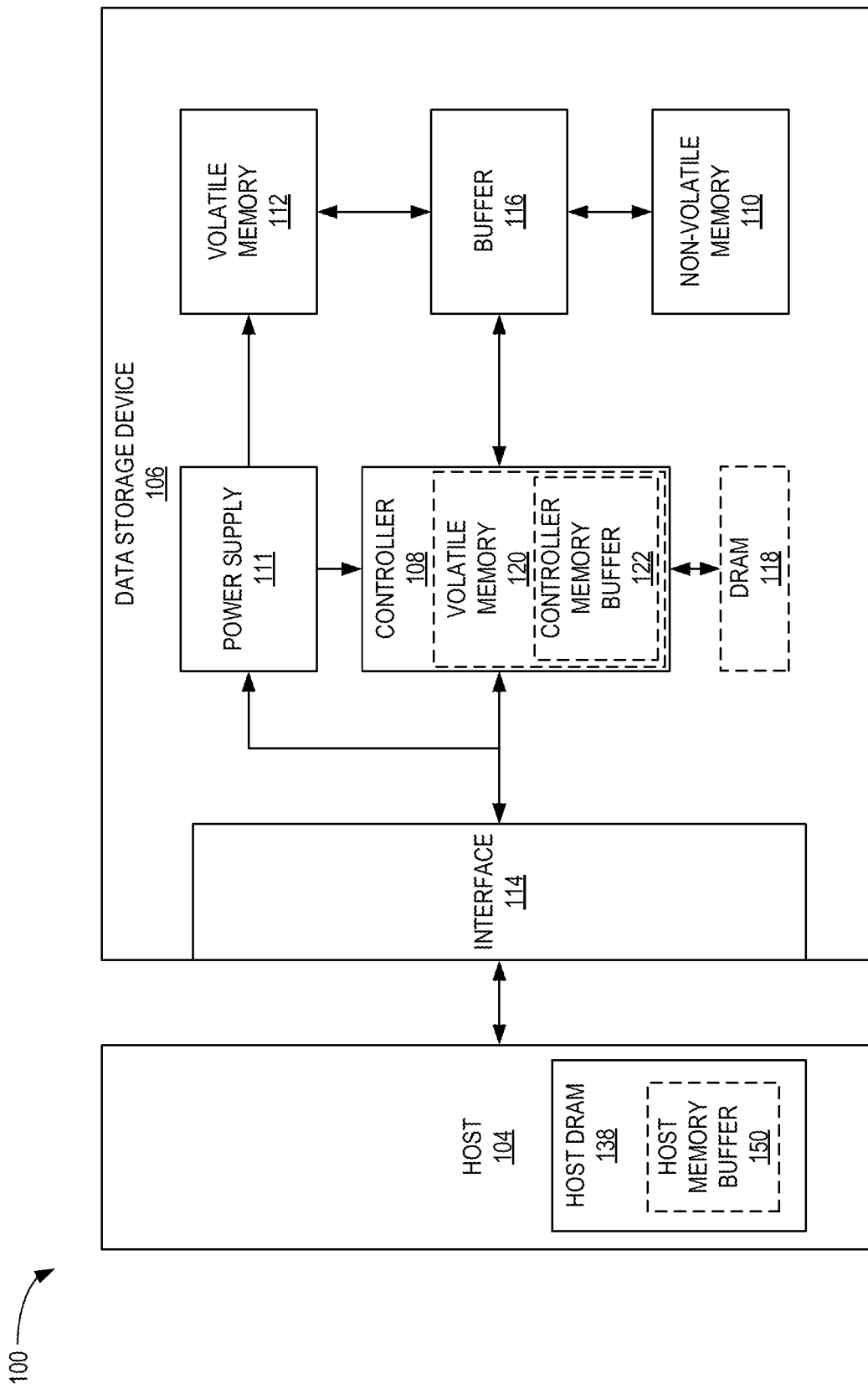
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Unlike conventional security layers places at standard storage devices, an advanced privacy protection approach is proposed that is based on inherent physical characteristics of the storage device in a way that will boost privacy protection levels of storage devices. Previously, device controllers incorporated a single interface towards a host device for transferring data. Security was enforced using logical protection of specific namespaces or logical block address (LBA) ranges. Until the instant disclosure, there is no physical interface that is limited only to write access in SSDs. As will be discussed herein, a designated write only storage logging device is presented that can accept sequential streams and automatically overwrite itself where read of the log material is only done in a secure manner using a different and physically separate connection than the one used for writes. Additionally, the storage device may have LBA ranges that work as write only as well as other LBA ranges that are normal and subject to both reads and writes. Such LBA ranges would allow for a traditional file system as well, sharing the storage, but will still protect the log areas that would be used for events that should not be read out.

Figure 2:
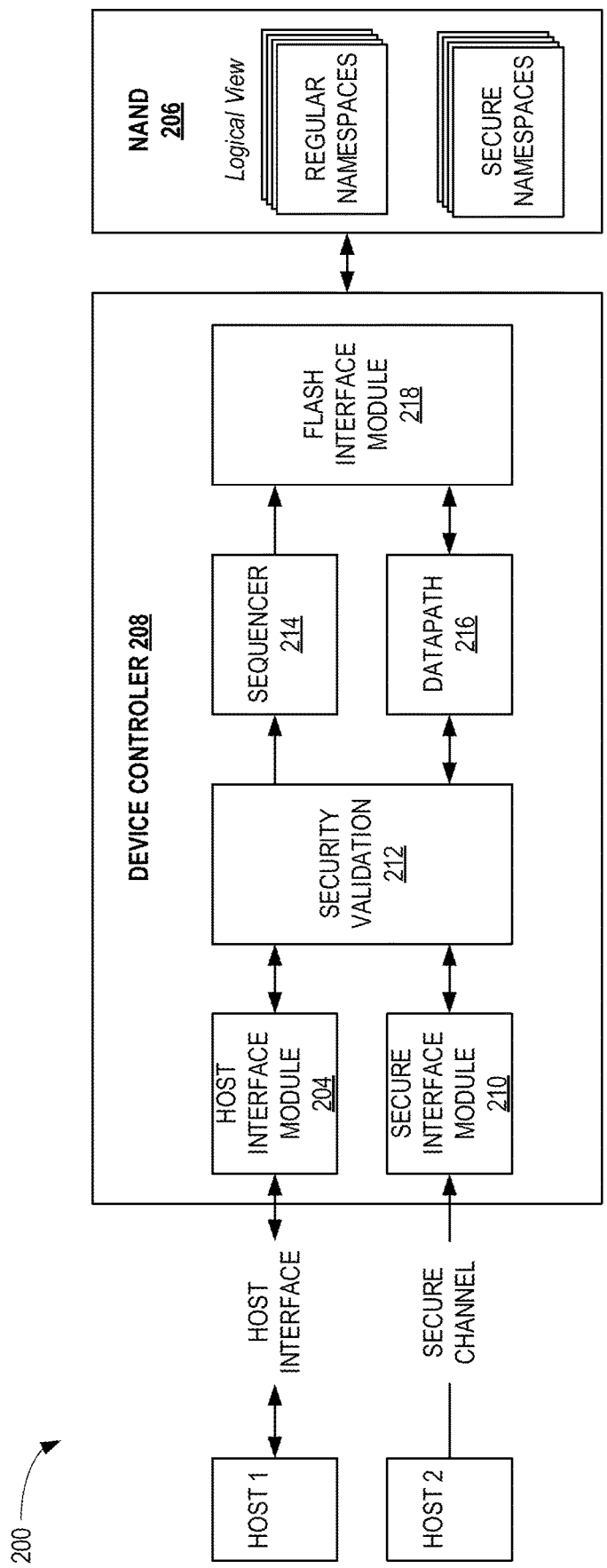
FIG. 2 is a block diagram illustrating a storage system in which a logging device can accept sequential streams and automatic self overwrites, according to one embodiment.

FIG. 2 is a block diagram illustrating a storage system 200 in which a logging device can accept sequential streams and automatic self overwrites, according to one embodiment. The read of the log material can be done in a secure manner using a different and separate physical connection than the one used for the write interface. In order to be able to read data from the storage device, a different physical interface needs to be attached to the storage device. Host 1 sees the storage as a write-only interface and cannot read data from the storage for privacy reasons. In order to be able to read from the storage, the device needs to be interfaced to a separate physical interface.

The device controller 208 incorporates two interfaces towards the host side. The first interface is the regular high-performance interface that utilizes the host interface module 204 (HIM) and the other is the secure channel that runs on a physical interface which is the secure interface module (SIM) 210. On the NAND 206 side, there are two types of namespaces incorporated. The first type is the regular namespaces where the host can access normally for read and write transactions. The other namespaces are secured, and the host can access them via the regular interface only for write transactions while read transactions are only allows using the secure channel.

The host 1 can send commands across the HIM 202 through the security validation module 212. The commands that are sent from the host 1 do not utilize privacy protection.

The security validation module 212 is responsible for validating the access type on the transactions coming from the HIM 204 and from the SIM 210. Once a command from the host 1 exits the security validation module 212, if the access is allowed, the command is queued in the sequencer 214. If access is not allowed, then the command is terminated and error completion is sent to the host. From the sequencer 214 the command enters the flash interface module (FIM) 218. In the NAND 206, the host 1 accesses the regular namespaces write transactions. The host 1 will automatically override write transactions.

The host 2 can send commands across the SIM 210 through the security validation module 212. The security validation module 212 is responsible for validating the access type on the transactions coming from the HIM 204 and from the SIM 210. Once a command from the host 2 exits the security validation module 212, the command moves through the data path 216 and enters the FIM 218. In the NAND 206, the host 2 accesses the secured namespaces via the secure channel. The SIM 210 is used to read the sensitive data out of the device controller 208 with a separate physical connection only.

When the controller limits the read capabilities from the storage device already at the command parsing level (e.g. in the security validation module 212) a security violation barrier will form privacy violations. The data from the read protected area cannot be read, but rather can be extracted via an authenticated interface in a physical separate connection or other means of layer security. In order to write to a restricted partition (can be defined by logical block address (LBA) range or by namespace), a ZNS like write-append command may be used, which disables random write access and allows sequential writes.

Figure 3:
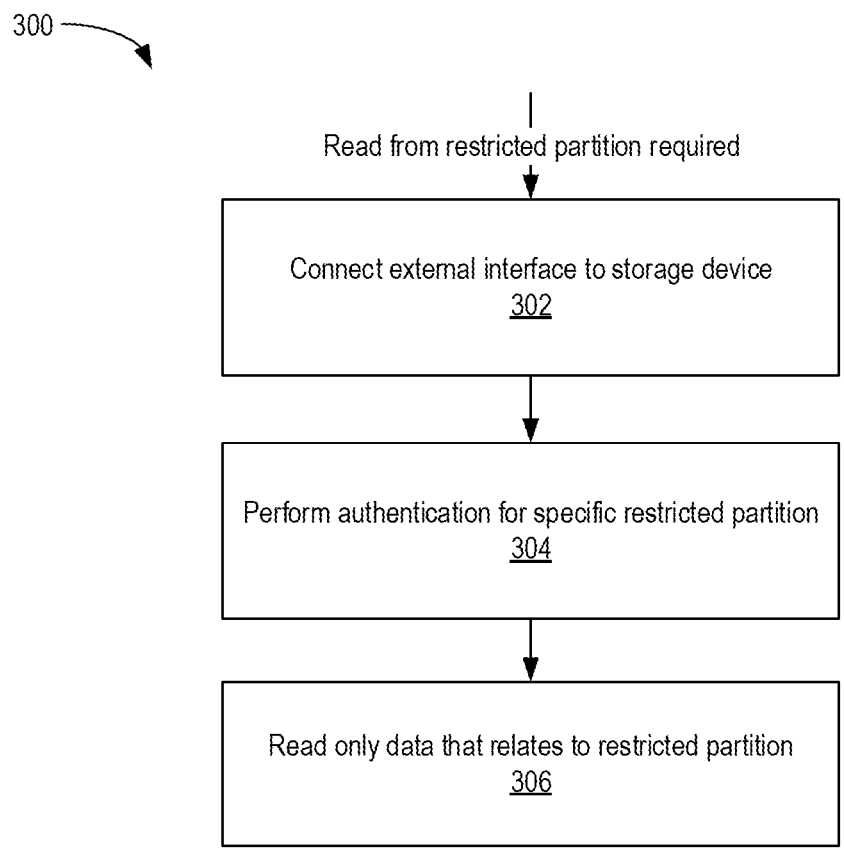
FIG. 3 is a flowchart illustrating a method for a read from restricted partition, according to certain embodiments.

FIG. 3 is a flowchart illustrating a method 300 for a read from restricted partition, according to certain embodiments. The method 300 begins with a read from a restricted partition. At block 302, the controller connects the external interface to the storage device. At block 304, the controller performs authentication for a specific restricted partition. At block 306, the controller reads data that relates to restricted partition.

Figure 4:
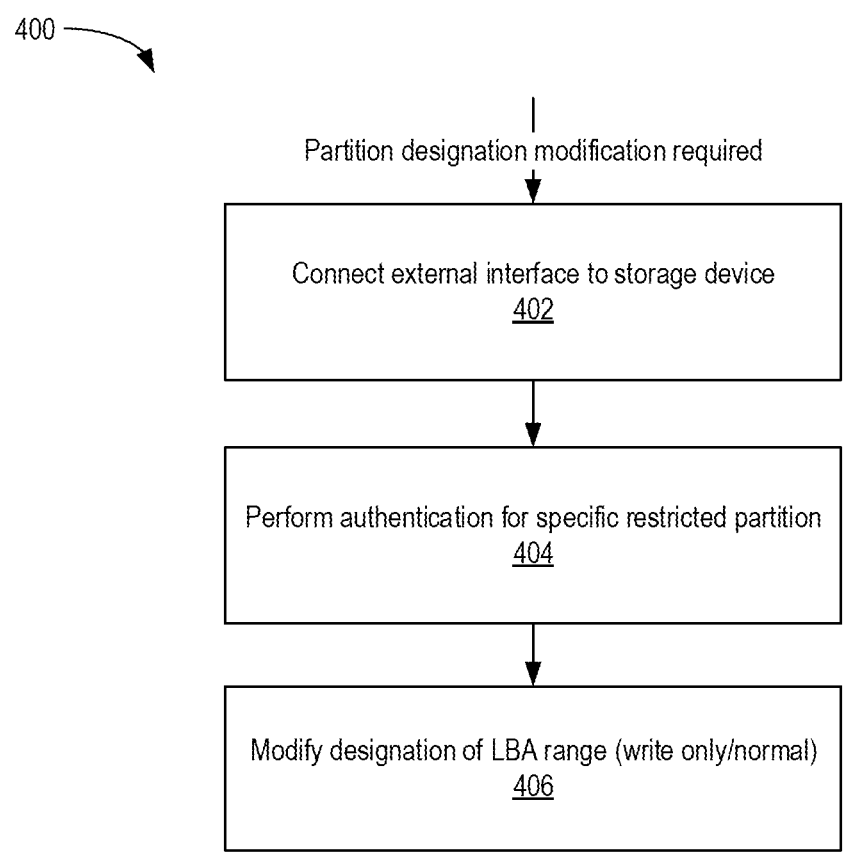
FIG. 4 is a flowchart illustrating a method for modifying designation of restricted LBA range, according to certain embodiments.

FIG. 4 is a flowchart illustrating a method 400 for modifying designation of restricted LBA range, according to certain embodiments. The method 400 begins with a partition designation modification. At block 402, the controller connects the external interface to the storage device. At block 404, the controller performs authentication for a specific restricted partition. At block 406, the controller modifies designation of logical block address (LBA) range (write only format).

Figure 5:
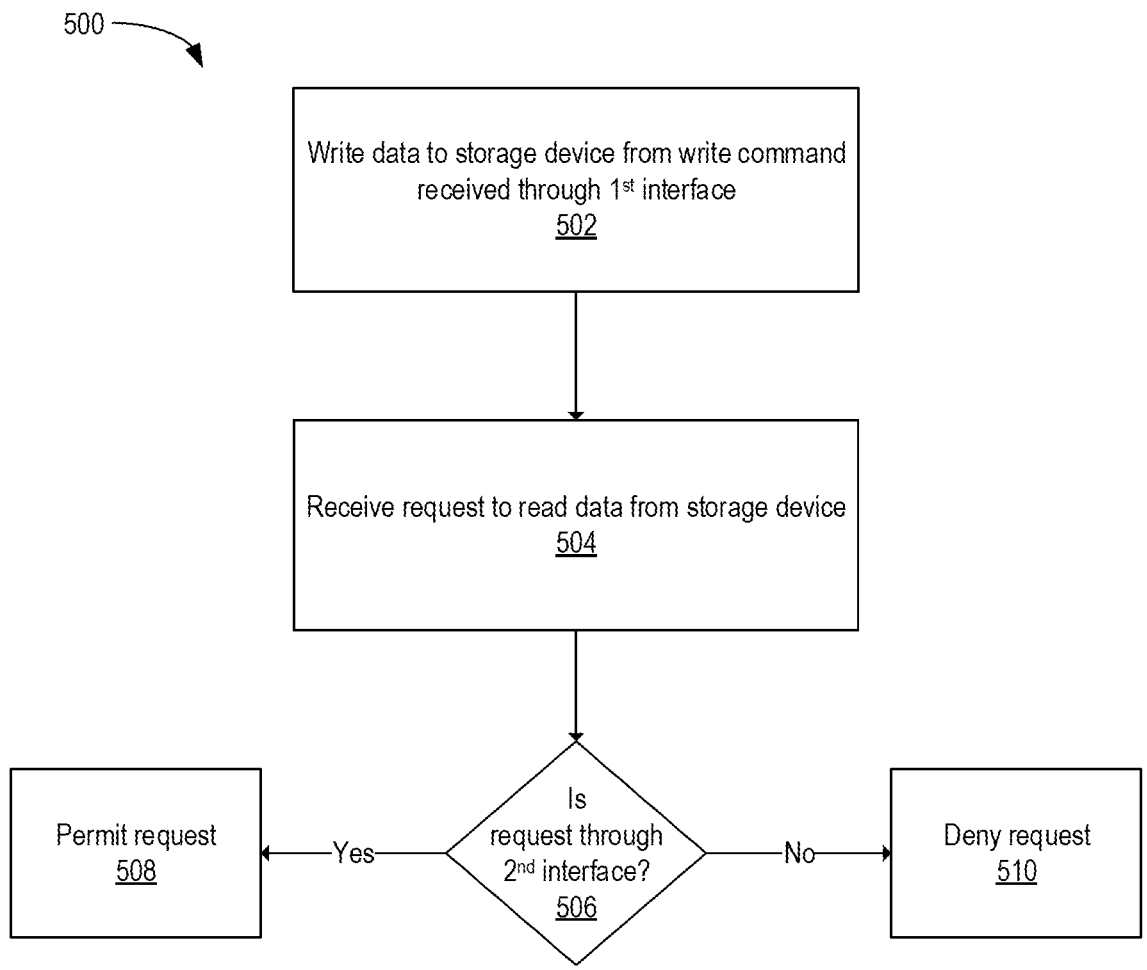
FIG. 5 is a flowchart illustrating a method for dual interface request management, according to certain embodiments.

FIG. 5 is a flowchart illustrating a method 500 for dual interface request management, according to certain embodiments. The method 500 begins at block 502. At block 502, the controller writes data to the data storage device from the write commands received through the first interface. At block 504, the controller receives a request to read data from the storage device. At block 506, the controller determines whether the request is through the second interface. If the controller determines that the request is through the second interface, then the method 500 proceeds to block 508. At block 508, the controller permits the request. If the controller determines that the request is not through the second interface, then the method 500 proceeds to block 510. At block 510, the controller denies the request.

In one embodiment, the secured channel can be sued to enable or disable certain features pertaining to the vehicle operations, multimedia, navigation, autonomous functions, etc. For example, the media is preloaded with navigation maps for the entire world, the secured channel is sued to disable maps for Far East countries for vehicles sold in South America.

In another embodiment, the secure channel physical interface is realized by a separate mechanical connector interface that also enables power to the device from the external secure interface. In this embodiment, the secure channel is not part of the main host interface and is not connected to the vehicle host, preventing attaches against the storage interface from the primary host interface. The separate physical interface also allows for the extraction of data and configuration without disconnecting the storage media.

Using the new approach of having a write-only interface will improve the security of high-end automotive devices.

In one embodiment, a data storage device comprises: a memory device; and a controller coupled to the memory device, wherein the controller is configured to: receive a first request to write data to the memory device, wherein the first request is transmitted through a first interface; write data to the memory device; and receive a second request to read data from the memory device, wherein the second request is through a second interface, and wherein the second interface is distinct from the first interface. The second interface and the first interface are physically distinct. The controller is configured to set first logical block addresses (LBAs) and second LBAs, wherein the first LBAs can be read from requests transmitted through the first interface, and wherein the second LBAs can be read only from requests transmitted through the second interface. The memory device has a first namespace and a second namespace, wherein the first namespace and the second namespace are distinct. The second namespace is a secure namespace that can only be read through requests transmitted through the second interface. The controller comprises a security validation module. The security validation module is coupled to the first interface and the second interface. Read requests cannot be processed through the first interface. The controller is configured to perform authentication for requests through the second interface. The controller is configured to detect a connection established through the second interface.

In another embodiment, a data storage device comprises: a memory device; and a controller coupled to the memory device, wherein the controller comprises: a first interface, wherein the first interface configured to receive commands to write data to the memory device; and a second interface, wherein the second interface is configured to receive commands to read data from the memory device, wherein the first interface and the second interface are physically distinct, wherein the controller is configured to ignore read commands received through the first interface. The controller includes a security validation module configured to validate read requests received. The controller is configured to receive instructions to enable or disable security parameters associated with accessing the memory device, wherein the instructions are configured to be received through the second interface and not the first interface. The controller is configured to receive power through the second interface. The controller is configured to have a first host device physically connected to the first interface and a second, distinct host device physically connected to the second interface while the first host device remains connected to the first interface.

In another embodiment, a data storage device comprises: means to store data; and a controller coupled to the means to store data, wherein the controller is configured to: receive a request to read data from the means to store data; determine that the data corresponding to the request is disposed in a restricted partition of the means to store data; authenticate an interface through which the request arrived, wherein the interface is a different interface than through which commands to write the data to the means to store data are received; and read the data. The controller is configured to restrict reads to non-restricted partitions of the means to store data such that reads to non-restricted partitions are requested through a different interface. The means to store data comprises a first namespace and a second namespace distinct from the first namespace, wherein the second namespace comprises the restricted partition of the means to store data. The controller is configured to receive a request to write data to the means to store data, wherein the request to write data is received through the different interface, and wherein the controller is configured to reject requests to read data received through the different interface. The controller is configured to define first logical block addresses (LBAs) as write only LBAs and second LBAs as read and write enabled LBAs.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device, wherein the memory device comprises:
      a first namespace accessible via a first interface; and
      a second namespace accessible via a second interface, wherein the first namespace and the second namespace are distinct; and
   a controller coupled to the memory device, wherein the controller is configured to:
      receive a first request to write data to the memory device, wherein the first request is transmitted through the first interface;
      write data to the memory device; and
      receive a second request to read data from the memory device, wherein the second request is received through the second interface, and wherein the second interface is physically distinct from the first interface, and wherein the second namespace is a secure namespace that can only be read through requests transmitted through the second interface.

2. The data storage device of claim 1, wherein the second interface and the first interface are physically distinct.

3. The data storage device of claim 1, wherein the controller is configured to set first logical block addresses (LBAs) and second LBAs, wherein the first LBAs can be read from requests transmitted through the first interface, and wherein the second LBAs can be read only from requests transmitted through the second interface.

4. The data storage device of claim 1, wherein the controller comprises a security validation module.

5. The data storage device of claim 4, wherein the security validation module is coupled to the first interface and the second interface.

6. The data storage device of claim 5, wherein read requests cannot be processed through the first interface.

7. The data storage device of claim 1, wherein the controller is configured to perform authentication for requests through the second interface.

8. The data storage device of claim 1, wherein the controller is configured to detect a connection established through the second interface.

9. The data storage device of claim 1, wherein the first interface uses a host interface module (HIM) and the second interface uses a physical interface.

10. The data storage device of claim 9, wherein the second interface is a secure interface module (SIM).

11. A data storage device, comprising:
    a memory device, wherein the memory device comprises:
       a first namespace accessible via a first interface; and
       a second namespace accessible via a second interface, wherein the first namespace and the second namespace are distinct; and
    a controller coupled to the memory device, wherein the controller comprises:
       the first interface, wherein the first interface configured to receive commands to write data to the memory device; and
       the second interface, wherein the second interface is configured to receive commands to read data from the memory device, wherein the first interface and the second interface are physically distinct, wherein the controller is configured to ignore read commands received through the first interface, wherein the second namespace can only be read through requests transmitted through the second interface.

12. The data storage device of claim 11, wherein the controller includes a security validation module configured to validate read requests received, and wherein read requests are validated by the security validation module before accessing the second namespace.

13. The data storage device of claim 11, wherein the controller is configured to receive instructions to enable or disable security parameters associated with accessing the memory device, wherein the instructions are configured to be received through the second interface and not the first interface.

14. The data storage device of claim 11, wherein the controller is configured to receive power through the second interface.

15. The data storage device of claim 11, wherein the controller is configured to have a first host device physically connected to the first interface and a second, distinct host device physically connected to the second interface while the first host device remains connected to the first interface.

16. A data storage device, comprising:
    means to store data, wherein the means to store data comprises:
       a first namespace accessible via a first interface; and
       a second namespace accessible via a second interface, wherein the first namespace and the second namespace are distinct, and wherein the first interface and the second interface are physically distinct; and
    a controller coupled to the means to store data, wherein the controller is configured to:
       receive a request to read data from the means to store data;
       determine that the data corresponding to the request is disposed in a restricted partition of the means to store data;
       authenticate whether the request arrived via the first or the second interface, wherein the first interface is a interface through which commands to write the data to the means to store data are received;
       determine that the request to read data disposed in the restricted partition was received via the second interface; and read the data if the request to read data disposed in the restricted partition was received via the second interface.

17. The data storage device of claim 16, wherein the controller is configured to restrict reads to non-restricted partitions of the means to store data such that reads to non-restricted partitions are requested through a different interface.

18. The data storage device of claim 16, wherein the means to store data comprises a first namespace and a second namespace distinct from the first namespace, wherein the second namespace comprises the restricted partition of the means to store data.

19. The data storage device of claim 16, wherein the controller is configured to receive a request to write data to the means to store data, wherein the request to write data is received through the first interface, and wherein the controller is configured to reject requests to read data received through the first interface.

20. The data storage device of claim 16, wherein the controller is configured to define first logical block addresses (LBAs) as write only LBAs and second LBAs as read and write enabled LBAs.

\* \* \* \* \*